United States Patent [19]

Basheer et al.

[11] Patent Number: 5,221,828
[45] Date of Patent: Jun. 22, 1993

[54] HEATED WIPER BLADE USING CONDUCTIVE ELASTOMER

[75] Inventors: Rafil A. Basheer, Rochester; Ismat A. Abu-Isa, Rochester Hills; Darrel S. Nelson, Warren, all of Mich.

[73] Assignee: General Motors Corporation, Detroit, Mich.

[21] Appl. No.: 914,276

[22] Filed: Jul. 16, 1992

[51] Int. Cl.$^5$ .......................... B60L 1/02; H05G 3/06; A47L 1/00
[52] U.S. Cl. .................................. 219/202; 219/522; 219/553; 15/250.05; 15/250.06
[58] Field of Search .............. 219/202, 203, 522, 553; 15/250.05, 25.06

[56] References Cited

U.S. PATENT DOCUMENTS

| | | | |
|---|---|---|---|
| 3,757,088 | 9/1973 | Osborn | 219/553 |
| 3,948,811 | 4/1976 | Clary et al. | 252/512 |
| 4,616,060 | 10/1986 | Killgoar, Jr. | 524/574 |
| 4,861,819 | 8/1989 | Theodore et al. | 524/491 |

Primary Examiner—Bruce A. Reynolds
Assistant Examiner—Michael O. Switzer
Attorney, Agent, or Firm—Randy W. Tung

[57] ABSTRACT

A heated wiper blade has a conductive elastomer body and a pair of electrodes along each side of the body. The elastomer which has a resistivity in the range of 20–128 ohm-cm and a hardness of Shore A 64–70 comprises a rubber compound including carbon black in the range of 37–60 phr, a small amount of graphite in the range of 13 to 20 phr and a low concentration of plasticizer oil in the range 20–40 phr.

9 Claims, 1 Drawing Sheet

HEATED WIPER BLADE USING CONDUCTIVE ELASTOMER

FIELD OF THE INVENTION

This invention relates to heated windshield wiper blades and particularly to such blades having a conductive elastomer body and electrodes for applying heating current to the body.

BACKGROUND OF THE INVENTION

It has been proposed to heat the windshield of an automotive vehicle to defrost the windshield. It has been found that in cold weather the water defrosted from the windshield can run down and freeze onto the windshield wipers, thereby immobilizing the wipers. It is thus desirable, for such a system, to provide heated wipers to prevent this from happening. In addition a heated wiper will also melt ice accumulated on it during heavy snow storms to insure a functional wiper system. Even in the absence of snow and ice the wiping characteristics of a blade deteriorates at low temperatures, and a heated wiper blade would allow more consistent wiping efficiency over a temperature range.

It is known to make heated wiper blades with non-conductive rubber containing a resistive wire or other heater element for heating by an applied current. The heat is generated in the wire and must flow across the wire/rubber interface to heat the wiper. Excessive heating will occur next to the heating wire which would lead to the degradation of the rubber and a lower life for the blade. Another disadvantage is the need for a sophisticated circuit to control the heating of the blade and to prevent a runaway rise in temperature.

The use of a conductive elastomer as a wiper blade directly heated by electricity overcomes the difficulties encountered in using a wire heater; the current would flow all through the conductive blade to generate the heat in the blade itself. The conductive elastomer is inherently self limiting as a conductor: the resistivity increases with temperature and reaches very high values to limit the heating effect such that the temperature stabilizes at some value depending on the elastomer composition. This self limiting feature would prevent undesirably high temperatures and is accomplished without the use of a regulator or a complex circuit.

It is known to use carbon black in the formulation of rubber or other elastomer to make the elastomer conductive. To induce sufficient conductivity for a heated wiper, a high concentration of carbon black is required. Such a high concentration of carbon black will increase the modulus and the hardness of the rubber so that it is no longer suitable for a wiper blade application. Typical commercially available wiper blades have a hardness between 50 and 70 Shore A. A properly compounded natural rubber made conductive using only carbon black would have a Shore A durometer of 90. Such a hard material would not be acceptable for wiper blade applications.

In the formulation of rubber, plasticizers such as oils are used to soften the material. Normally the addition of such plasticizers reduce the conductivity of carbon black filled elastomers. However, we have discovered that the addition of low concentrations of plasticizers sometimes improves the conductivity. Further, we have discovered that the addition to the carbon black of graphite in low concentrations also improves the conductivity so that the amount of carbon black can be reduced, although larger concentrations of graphite decrease the conductivity. Thus by combining the discovered effects of graphite and plasticizing oils a conductive elastomer of suitable hardness can be formulated.

SUMMARY OF THE INVENTION

It is therefore an object of the invention to provide a wiper blade comprising a conductive elastomer having a suitable hardness for heating by an electrical current.

The invention is carried out by a heated wiper blade comprising: a conductive elastomer body; and means for applying electrical current to the body including a pair of electrodes extending either externally or internally along the body in electrical contact therewith; the conductive elastomer having a hardness in the range of 50 to 70 Shore A and a conductivity sufficient to heat the blade when energized, and wherein the elastomer includes graphite in the range of about 13 to 20 phr and carbon black.

The invention is further carried out by including in such an elastomer a plasticizer in the range of 20 to 40 phr.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
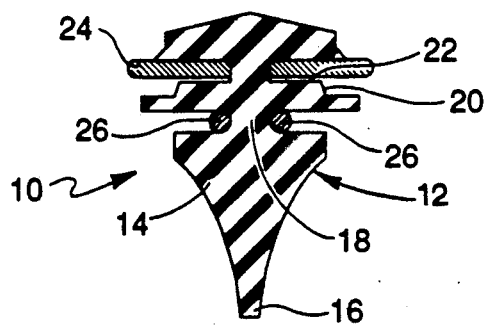
FIG. 1 is a cross section of a wiper blade according to the invention.

Referring to FIG. 1, a wiper blade 10 has an elastomer body 12 having a wiping section 14 of generally triangular cross section terminating in a wiping edge 16 and connected through a flexible neck 18 to a base 20. A groove 22 on each side of the base 20 holds a steel reinforcing rib 24 which extends along the blade. A wire electrode 26 is attached to each side of the neck 18 and also extends along the blade in good electrical contact with the blade. The wire electrodes 26 are connected through switching circuitry to the vehicle battery, not shown. The shape of the elastomer body is conventional and the placement of the electrodes 26 is selected on the basis of convenience as well as efficacy. Alternate electrode locations may prove to be desirable, however.

The elastomer used for the blade must have a conductivity sufficiently low to effect blade heating by current passing through the blade when the battery voltage is applied to the electrodes. The battery voltage is nominally 13.6 volts. The optimum value of the elastomer conductivity depends on the desired blade temperature, the electrode locations and especially the electrode separation. Tests made for the configuration shown in the drawings showed effective heating occurring in the resistivity range of 20 to 115 ohm-cm.

The elastomer also must have mechanical properties which are suitable for wiper blades. To assure flexibility and proper wiping action the hardness is selected to lie in a range of 50 to 70 Shore A as measured using ASTM method D2240.

The development of conductive elastomers for heated wiper blades involved the evaluation of a number of rubber compositions which varied according to the type of rubber, conductive additives and plasticizers. While natural rubber is known to be a desirable wiper blade elastomer, the evaluation included others such as polypropylene oxide (PPO), bromobutyl rubber (BBR), ethylene-propylene diene elastomer (EPDM) and blends thereof. Accordingly the data collected on the effects of conductive fillers and plasticizers were often based on systems other than natural rubber but the discoveries made during the tests were found to apply to natural rubber formulations.

All carbon-rubber composites depend on the conductivity of carbon for their desirable electrical properties, whether the carbon is in the form of graphite fibers, sheets, or particles. The mechanism of electrical conduction in such composites is that of a physical mixture of a conductor with an insulator. When the conductor is present in high enough proportions, electrons can either tunnel or percolate through its network. Complex mechanisms involving many physical and chemical parameters determine the carbon dispersion and the resultant conductivity so that a full analysis is difficult.

A number of carbon blacks were tested to determine their effects on conductivity and hardness. For example, carbon blacks identified as N110, N330, N762, Microblack, and XC-72 were mixed in a PPO/BBR blend containing 90 parts per hundred parts of rubber (phr) carbon black and 10 phr graphite A99 yielded resistivities ranging from 3.3 ohm-cm (for XC-72) to values larger than $10^6$ ohm-cm (for microblack). The tests indicated a trend of decreased resistivity for increased surface area, although the data showed some variance from that trend. The XC-72 variety was selected on the basis of the low resistivity as well as low cost. The XC-72 carbon black has a mean particle size of 38 millimicrons and a surface area of 238 $m^2/g$. The XC-72 black is a hollow graphite sphere (porous) and is highly structured. The hollow shells tend to fracture, interpenetrate and form chains and aggregates even when dispersed in a polymer matrix. Although the individual XC-72 carbon particles may be spherical, their aggregation makes the electrical behavior similar to systems containing filamentary conductors in a random arrangement to yield continuous conduction paths. In this case percolation is achieved at lower volume percent of filler than for the case of other carbon black grades.

Figure 2:
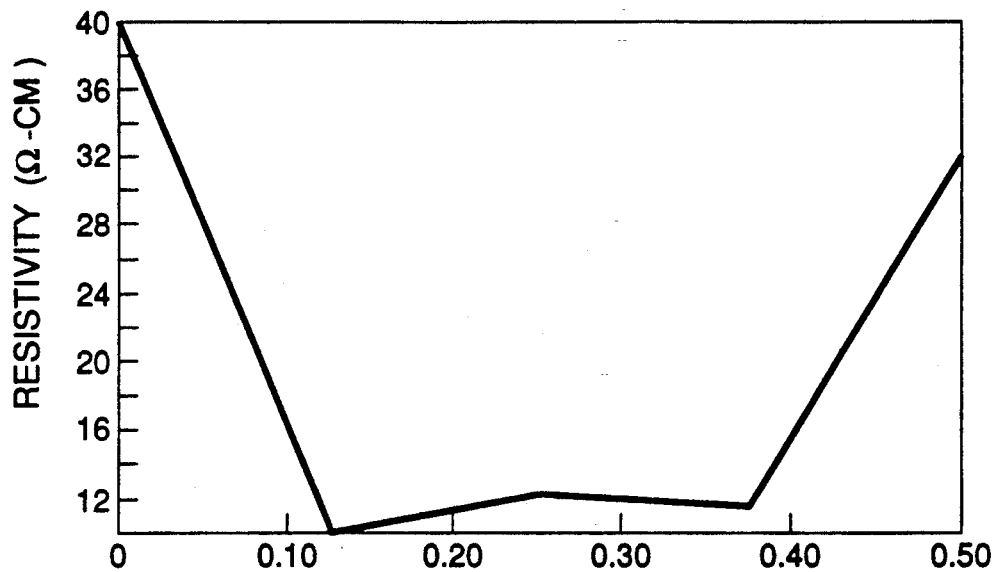
FIG. 2 is a graph showing the effect of different concentrations of graphite on the resistivity of an elastomer.

The effect of graphite on the conductivity of elastomer was evaluated by mixing various proportions of graphite to the carbon black filler. The graph of FIG. 2 shows the result of different fractions of graphite of total filler in a formulation of BBR containing 40% by weight of XC-72 carbon black/graphite filler. In this way it was discovered that the resistivity significantly decreases for small additions of graphite and then increases for larger additions of graphite. Thus, a lower concentration of carbon black could be used to arrive at the required conductivity. Using this information it was possible to improve the conductivity of the elastomer while limiting the amount of carbon black and the hardness due to the carbon black. Several grades of graphite were tested including A625, A99, 4014, Micro470, and Micro450. The A625 graphite was selected based on properties and cost. The A625 graphite has an average particle size of 45 microns mean diameter and a surface area of 0.22 $m^2/g$.

Although oils and plasticizers normally reduce the conductivity of carbon black filled elastomers, the addition of a plasticizer was evaluated for the purpose of softening the material. It was discovered, however, that the addition of small amounts of plasticizer sometimes improves the conductivity. The following table shows the effect of plasticizer of the resistivity of a rubber blend of BBR (40 phr) and EPDM (60 phr) containing 10 phr graphite A99 and 90 phr carbon black N330.

| Plasticizer (phr) | Resistivity (ohm-cm) |
| --- | --- |
| 0 | 1768 |
| 10 | 56 |
| 30 | 5357 |

Thus the addition of a very small amount of plasticizer has a dramatic effect on the resistivity. An explanation of this phenomenon is that the presence of low concentrations of plasticizers helps the dispersion of carbon black in the rubber matrix during processing.

Combining the discovered effects of graphite and plasticizing oils several natural rubber formulations were developed with Shore A hardness values of 64 to 70 and resistivities of 20 to 128 ohm-cm as shown in the following table.

| Ingredients | Concentration of Ingredients (phr) | | | |
| --- | --- | --- | --- | --- |
| Natural Rubber | 100 | 100 | 100 | 100 |
| Zinc Oxide | 5 | 5 | 5 | 5 |
| Stearic Acid | 1 | 1 | 1 | 1 |
| Dipentamethylene thiuram tetrasulfide (Sulfads) | 0.5 | 0.5 | 0.5 | 0.5 |
| Sulfur | 2.5 | 2.5 | 2.5 | 2.5 |
| 2-mercaptobenzothiazole (Captax) | 2 | 2 | 2 | 2 |
| Carbon black (XC-72) | 45 | 37 | 37 | 60 |
| Graphite (A625) | 15 | 13 | 13 | 20 |
| Aromatic Oil (Sundex 750T) | 30 | 30 | 20 | 40 |
| Properties | | | | |
| Resistivity (ohm-cm) | 42–48 | 125–128 | 82–115 | 20–29 |
| Hardness (shore A) | 69 | 64 | 68 | 70 |

The role of each ingredient not already discussed is well known in the art of rubber formulation. The zinc oxide helps in vulcanization and combines with the stearic acid to form zinc stearate. The sulfads, sulfur and Captax are also vulcanizing or curative agents. The filler comprising the carbon black and the graphite is mixed in advance and then added to the rubber while the rubber is being milled. Finally the curative agents are added to the rubber and the compound is vulcanized in a mold.

Figure 3:
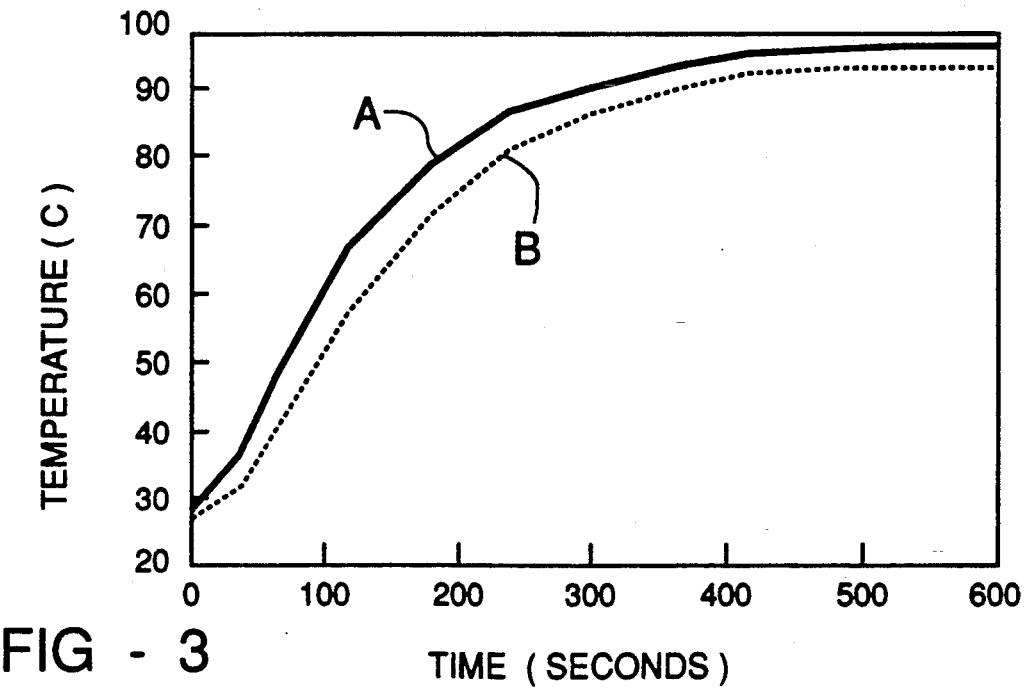
FIG. 3 is a graph showing the temperature rate of increase of a wiper blade made according to the invention.

In the temperature range between 25° and 120° C., the conductive elastomer exhibits a small but positive coefficient of resistivity amounting to a 10% rise in the resistance as the temperature increases to 120° C. The low sensitivity of the resistance with increasing temperature is attributed to the high carbon loading above the percolation threshold in these conductive rubbers. The heating rate of a conductive wiper blade fabricated according to the FIG. 1 configuration is shown in FIG. 3. A voltage of 13.6 volts was applied through the electrodes 26 which run the whole length of the blade 10. Thermocouples were located at the wiping edge 16, one at the middle of the blade length yielding curve A and one at an end yielding curve B. Beginning at room temperature the initial heat rate is rapid, but the heating rate decreases as the temperature increases. The temperature levels off at about 98° C. This self limiting feature is very important for the wiper blade application since it eliminates the need for regulators in the circuit. Tests indicate that the amount of temperature rise is dependent on the initial conductivity of the elastomer.

The major goal of the development of conductive elastomer formulations for heated wiper blades is to be able to promote enough conductivity and yet retain the appropriate physical and mechanical properties of the elastomer for successful performance as a windshield wiper blade. For this reason the proposed formulations are based on natural rubber, the elastomer most commonly used in this application. In order to maintain tensile, tear, abrasion and hardness properties the amount of reinforcing filler (carbon black) should be maintained at about the same level as in the non-conductive blade material. The use of graphite and plasticizer in the correct proportions has enabled this balance to be achieved. It is thus seen that the elastomer formulation comprising carbon black and graphite in the range of about 13 to 20 phr and plasticizer oil in the range of 20 to 40 phr has the unusual property of both low resistivity and low hardness suitable for a heated windshield wiper blade.

The embodiments of the invention in which an exclusive property or privilege is claimed are defined as follows:

1. A heated wiper blade comprising:
a conductive elastomer body; and
means for applying electrical current to the body including a pair of electrodes extending along the body in electrical contact therewith;
the conductive elastomer having a hardness in the range of 50 to 70 Shore A and a conductivity sufficient to heat the blade when energized, and wherein the elastomer includes graphite in the range of about 13 to 20 parts per hundred parts of elastomer and carbon black.

2. The invention as defined in claim 1 wherein the elastomer includes carbon black in the approximate range of 37 to 60 parts per hundred parts of elastomer.

3. The invention as defined in claim 1 wherein the elastomer includes a plasticizer in the range of 20 to 40 parts per hundred parts of elastomer.

4. A heated wiper comprising: a conductive elastomer body; and means for applying electrical current to the body including a pair of electrodes extending along the body in electrical contact therewith;
the conductive elastomer comprising a matrix of natural rubber containing carbon black, graphite and plasticizer, the graphite and plasticizer having low concentrations sufficient to increase the electrical conductivity of the elastomer and reduce the hardness of the elastomer to a hardness suitable for windshield wiper blades.

5. The invention as defined in claim 4 wherein the graphite is present in the range of about 13 to 20 parts per hundred parts of rubber.

6. The invention as defined in claim 4 wherein the plasticizer is an aromatic oil having a concentration of about 20 to 40 parts per hundred parts of rubber.

7. A heated wiper blade comprising:
a conductive elastomer body; and
means for applying electrical current to the body including a pair of electrodes extending along the body in electrical contact therewith;
the conductive elastomer comprising a matrix of natural rubber containing a filler in the range of about 50 to 80 parts per hundred parts of rubber, the filler comprising about one part of graphite to three parts of carbon black, and a plasticizer comprising about two parts of oil to one part of graphite.

8. The invention as defined in claim 7 wherein the average particle size of the graphite is on the order of 45 microns and of the carbon black is about 38 millimicrons mean diameter.

9. The invention as defined in claim 7 wherein the filler is A625 graphite and XC-72 carbon black.

* * * * *